(12) United States Patent
Hayashida et al.

(10) Patent No.: US 6,781,265 B2
(45) Date of Patent: Aug. 24, 2004

(54) LINEAR ACTUATOR

(75) Inventors: Shuuji Hayashida, Kawasaki (JP);
Seigo Takahashi, Sagamihara (JP);
Osamu Saito, Yokohama (JP)

(73) Assignee: Mitutoyo Corporation, Kawasaki (JP)

( * ) Notice: Subject to any disclaimer, the term of this patent is extended or adjusted under 35 U.S.C. 154(b) by 176 days.

(21) Appl. No.: 10/247,042

(22) Filed: Sep. 19, 2002

(65) Prior Publication Data

US 2003/0052550 A1 Mar. 20, 2003

(30) Foreign Application Priority Data

Sep. 20, 2001 (JP) ........................................ 2001-287643

(51) Int. Cl.[7] .............................................. H02K 41/07
(52) U.S. Cl. ...................... 310/80; 74/89.23; 74/89.33; 74/89.34
(58) Field of Search ............................. 74/89.23, 89.32, 74/89.33, 89.34; 310/20, 80, 75 R, 83; H02K 41/07

(56) References Cited

U.S. PATENT DOCUMENTS

| | | | |
|---|---|---|---|
| 3,028,513 A | * | 4/1962 | Sundt ........................... 310/83 |
| 4,496,865 A | | 1/1985 | Allen et al. .................... 310/80 |

FOREIGN PATENT DOCUMENTS

| | | | |
|---|---|---|---|
| JP | 62-37708 | 6/1987 | |
| JP | 406022498 A | * 1/1994 | ............ H02K/7/06 |

* cited by examiner

*Primary Examiner*—Thanh Lam
*Assistant Examiner*—Judson H. Jones
(74) *Attorney, Agent, or Firm*—Rankin, Hill, Porter & Clark LLP

(57) ABSTRACT

A compact and simple linear actuator includes a spindle to a main body so as to be capable of moving in an axial direction, displacement detection device, a motor, and a transmission mechanism. The displacement detection device detects a movement displacement amount of the spindle. The motor is disposed adjacent a proximal end one of the spindle and on the same axis as the spindle. The transmission mechanism transmits turning force of the motor to the spindle. The transmission mechanism includes a first rotary member fitted to the proximal end of the spindle and integrally rotating with the spindle, a second rotary member fitted to a rotor of the motor, and connection rods for transmitting rotation of the second rotary member to the first rotary member. The connection rods have axes that are parallel to an axis of the spindle while being displaced from the spindle axis. The connection rods are rigidly connected to one of the first and second rotary members, and slidably received by the other of the first and second rotary members.

19 Claims, 6 Drawing Sheets

LINEAR ACTUATOR

BACKGROUND OF THE INVENTION

1. Field of the Invention

The present invention generally to linear actuators and, more particularly, to linear actuators used for moving a spindle by a driving source, such as a motor, and for minutely positioning a work.

2. Description of Related Art

Automatic alignment apparatuses in the optical industry and associated industries, inclusive of optical fibers, use a fine positioning device for minutely positioning a work. Some of the minute positioning devices known in the art use a driving source, such as a motor, to move a driving member.

Japanese Utility Model Laid-Open No. 37708/1987 (hereinafter JP 37708/1987) and U.S. Pat. No. 4,496,865 (hereinafter U.S. '865) disclose minute positioning devices that use a motor to move the spindle.

The linear actuator described in JP 37708/1987 is a micrometer head. The micrometer head includes a cylindrical spindle provided inside a main body and having a female screw on its inner circumference, a driving shaft rotatably supported by the main body and having a male screw meshing with the female screw of the spindle, a motor having a rotor that is juxtaposed with the spindle, and a gear train for transmitting the rotation of the rotors of the motor to the driving shaft.

In such a construction, when the motor is driven for rotation, the gear train transmits the rotation of the rotor to the driving shaft. The rotation of the driving shaft, in turn, moves the spindle in the axial direction.

The linear actuator described in U.S. '865 includes a main body, a spindle meshed with the main body by a screw and arranged movably from one of the end sides of the main body in an axial direction, and a motor arranged at the other end of the spindle and having rotors fixed thereto so as to be capable of integrally rotating. A groove is defined in the axial direction inside the main body and the motor has a protuberance meshing with the groove. Due to engagement between the groove and the protuberance, the motor can move in the axial direction of the spindle while its rotation is restricted. When the U.S. '865 rotor turns, the spindle rotates and moves in the axial direction due to its engagement with the main body.

Unfortunately, the constructions taught by the aforementioned prior art devices suffer from disadvantages that limit their usefulness. For example, in the assembly of JP 37708/1987, the spindle and the motor are juxtaposed. Therefore, to transmit rotation of the rotor to the spindle, a gear mechanism must be provided therebetween. Hence, a large space in the vertical direction relative to the spindle must be provided to accommodate the motor and the gear train. Consequently, the size of the linear actuator is unavoidably large.

In the assembly of U.S. '865, the spindle and the rotor are directly coupled. To restrict rotation of the motor, therefore, it is necessary to engage the main body with the motor by engaging the groove with the protuberance. Since the motor, too, moves integrally with the spindle, a space for accommodating cables of the motor must be provided over the moving range of the motor. This construction, too, increases the size of the linear actuator. Also, since the cables undergo extension and contraction as the motor moves axially, they are likely to be damaged.

Furthermore, since force for moving the motor itself, in addition to the force for rotating the spindle, is necessary, the motor output must be increased.

SUMMARY OF THE INVENTION

It is therefore an object of the invention to provide a linear actuator that eliminates or minimizes the problems found in the prior art technologies. It is a further object of the invention to provide a linear actuator of reduced size and simple construction.

The present invention is directed toward a linear actuator having a driving member fixed by a screw to a main body so as to be capable of moving in an axial direction; displacement detection means for detecting an amount of movement displacement of the driving member in the axial direction; rotation driving means disposed on one of the end sides of the driving member on the same axis as that of the driving member; and a transmission mechanism for transmitting turning force of the rotation driving means to the driving member. The transmission mechanism includes a first rotary member fitted to one of the end sides of the driving member and integrally rotating with the driving member. A second rotary member is fitted to a rotary shaft of the rotation driving means and connection rods for transmitting rotation of the second rotary member to the first rotary member. The connection rods are arranged parallel to, but radially displaced from, an axis of the driving member, and are connected to one of the first rotary member and the second rotary member, and engaged with the other of the first and second rotary members so as to be capable of sliding in an axial direction while transferring rotary motion between the first and second rotary members.

In further accordance with the present invention, the transmission mechanism transmits the turning force of the rotation driving means to the driving member, and the driving member is thereby rotated. The driving member is moved in the axial direction via engagement of the main body with the driving member, and the displacement detection means detects the amount of displacement of the driving member in the axial direction. Therefore, when the rotation driving means is controlled on the basis of the displacement amount of the driving member in the axial direction detected by the displacement detection means, movement of the driving member can be controlled with high precision.

In the transmission means, the turning force of the rotation driving means turns the second rotary member through the rotary shaft. Next, the connection rods transmit rotation of the second rotary member to the first rotary member, and the first rotary member is rotated. Subsequently, since the driving member and the first rotary member are connected for common or integral rotation, the driving member is rotated. Due to engagement between the main body and the driving member, the driving member is moved in the axial direction.

The connection rods are disposed parallel to the axis of the driving member and on axes different from the axis of the driving member. Therefore, the connection rods are rotated with the axes of the driving member and the rotation driving means as the center axis of rotation. Rotation of the second rotary member is transmitted to the first rotary member and to the driving member through rotation of the connection rods with the axis of the driving member as the center.

The connection rods are engaged with one of the first and second rotary members and are connected to the other of the first and second rotary members so as to be capable of sliding in the axial direction. Therefore, engagement between the first rotary member, connection rods, and second rotary member is maintained through sliding of the connection rod even when the interval or space between the first and second rotary members changes. Consequently, rotation is transmitted from the second rotary member to the first rotary member through the connection rod even when the interval or space between the first and second rotary members changes. In other words, even when only the driving member moves while the position of the rotation driving means is kept constant or unchanged, rotation can be transmitted from the rotation driving means to the driving member.

As a result, in the present invention it is not necessary to define the groove and the protuberance that have been required in the linear actuator structure according to the prior art wherein the rotation driving means moves with the driving member. In the present invention, a space for accommodating the cables in a distance corresponding to the moving distance of the rotation driving means is not necessary. Therefore, the risk of damaging the cables as a result of extension and contraction is eliminated.

Moreover, in the linear actuator according to the prior art, the main body and the rotation driving means are interconnected with each other by the engagement means, or the driving member and the rotation driving means are integrated with each other. Therefore, in the prior art it is impossible, or at best very difficult, to exchange or replace the rotation driving means. However, in the present invention, since the rotation driving means is merely fitted to the second rotary member, it can be easily exchanged and replaced by other rotation driving means in accordance with the intended application.

When the first rotary member and other members (connection rods, second rotary member, rotation driving member) are fitted to the driving member in the linear actuator for manually rotating the driving member, the linear actuator can be easily changed to a linear actuator using the rotation driving means.

In the linear actuator according to the present invention, the connection rods are slidably secured to one of the first and second rotary members so as to be capable of sliding in the axial direction. According to this construction, even when the interval or space between the first and second rotary members changes, the engagement between the first and second rotary members is maintained through sliding of the connection rods. Therefore, rotation can be transmitted from the second rotary member to the first rotary member even when the interval between them changes.

In accordance with the present invention, an alternative second rotary member includes a first member, a second member, and a spring member. The first member is secured to the rotation driving means, and the second member is secured to the first rotary member by the connection rods. The connection rods are connected to and integrally extend from the second member. The spring member interconnects the first and second members and serves to absorb any misalignment between the axis of the rotation driving means and the axis of the driving member.

The linear actuator according to the invention also has a knob rotating integrally with the rotary shaft of the rotation driving means. The knob is provided on the rotation driving means on the side opposite the driving member. When the knob is manually turned to rotate the rotary shaft of the rotation driving means, the transmission mechanism transmits this rotation to the driving member. Therefore, the driving member can be manually moved. Because the driving member can be manually moved without relying on the rotation driving means, excellent operational results can be obtained, especially when the position of the driving member is minutely adjusted.

In further accordance with the present invention, the linear actuator includes a third rotary member moving and rotating integrally with the driving member, a transparent member provided to a part of the side surface of the main body corresponding to the moving range of the third rotary member, a scale formed in the moving direction of the third rotary member, and another scale formed on the circumferential side surface of the third rotary member. When the driving member moves in the axial direction while rotating, the third rotary member, too, moves integrally and is rotated. Since the transparent member is provided to the side surface of the main body corresponding to the moving range of the third rotary member, the movement of the third rotary member can be visually confirmed through the transparent member, and the moving displacement amount of the driving member can be read from the scale provided on the main body. Further, the amount of rotation of the driving member can be read from the scale provided on the circumferential side surface of the third rotary member. Since the amount of rotation of the driving member is converted to the movement displacement amount in the axial direction from the pitch of the screw, minute displacement of the driving member can be read from the scale of the third rotary member in addition to the scale of the main body.

BRIEF DESCRIPTION OF THE DRAWINGS

These and further features of the invention will be apparent from the following description and drawings, wherein.

DETAILED DESCRIPTION OF THE PREFERRED EMBODIMENTS

Figure 1:
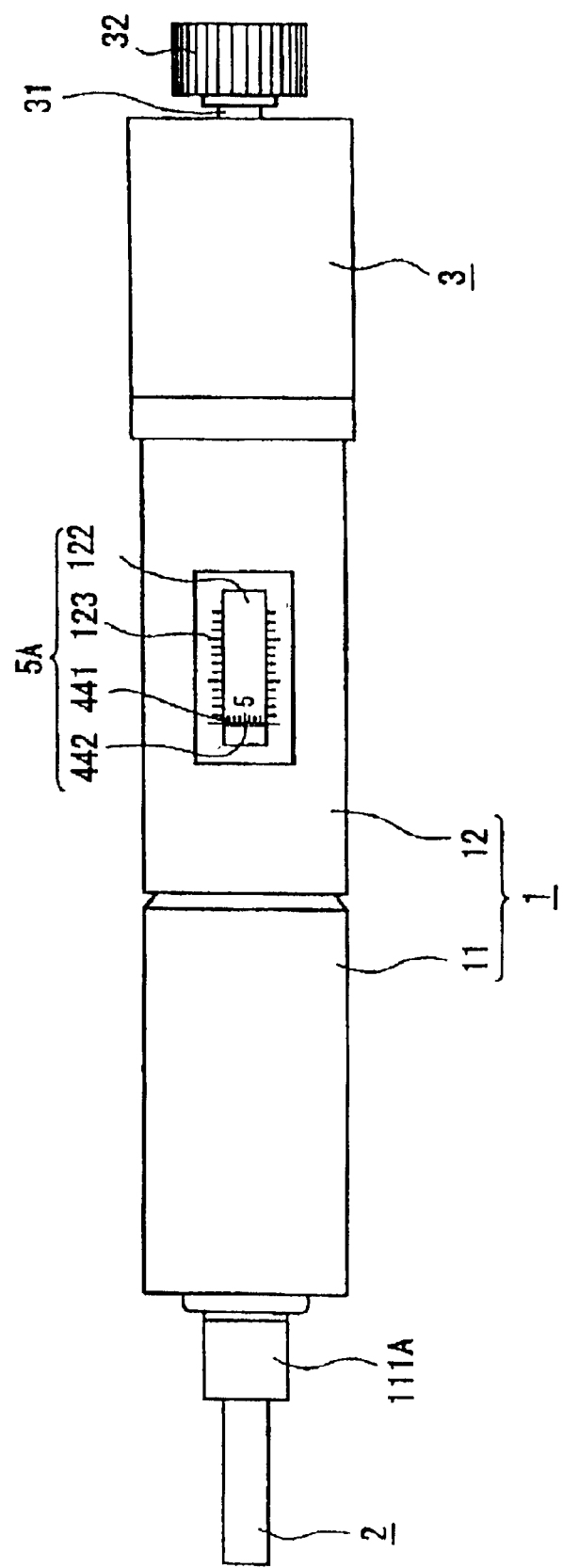
FIG. 1 is a side view showing a linear actuator according to a first embodiment of the invention.
Figure 2:
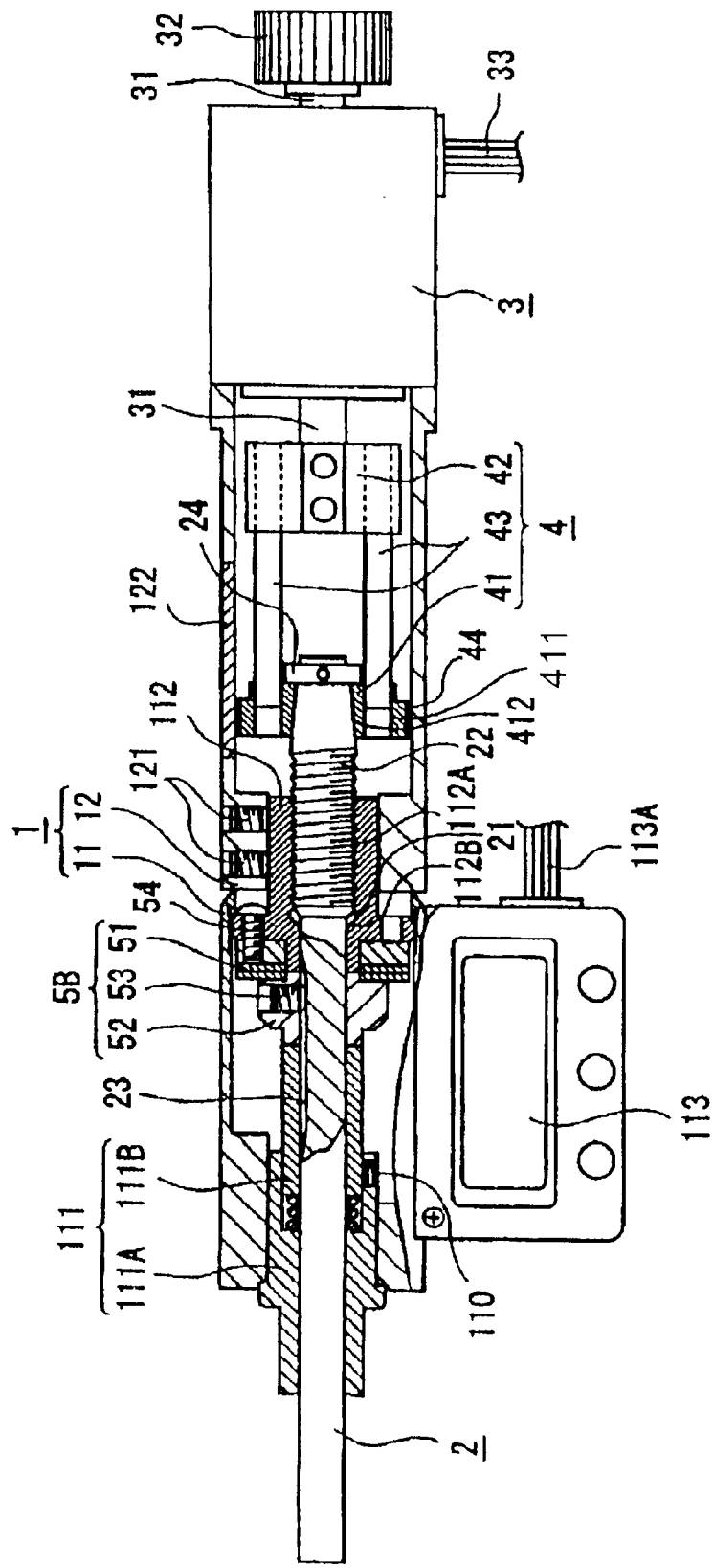
FIG. 2 is a cross-sectional view of the linear actuator of the first embodiment.

A linear actuator according to the first embodiment of the invention uses a motor to drive a spindle of a micrometer head, as shown in FIG. 1. The linear actuator, as shown in FIG. 2, includes a main body 1, a spindle 2, a stepping motor 3, a transmission mechanism 4, and displacement detecting means 5A, 5B. The spindle 2 serves as a driving member and is fixed by a screw to the main body 1 as to be capable of moving in an axial direction. The stepping motor 3 serves as a rotation driving means and is disposed adjacent a proximal end portion of the spindle 2 and is on the same axis as that of the spindle 2. The transmission mechanism 4 is interposed between the stepping motor 3 and the spindle 2 and serves to transfer the rotary drive from the motor 3 to the spindle 2. The displacement detecting means 5A, 5B reads the amount of axial displacement of the spindle 2.

The main body 1 includes a front frame 11 and a rear frame 12. The front frame 11 has a through-hole and covers the distal end portion of the spindle 2. The front frame 11 receives a cylindrical stem 111 in the through-hole on the first or distal end of the front frame 11. The stem 111 projects from the front frame distal end and slidably receives the spindle 2, as will be described more fully hereinafter.

A screw cylinder 112 is fixed by a screw in the front frame through-hole at the second or proximal end of the front frame 11. An inner circumference of the screw cylinder 112 defines a female screw 112A that meshes with the spindle 2 so as to threadably receive the spindle 2.

As shown in FIG. 2, an inner surface of the screw cylinder 112 defines a taper 112B. The taper 112B is disposed at a location intermediate the proximal and distal ends of the screw cylinder 112, and has an increasing diameter as one moves from the distal end toward the proximal end. Accordingly, the screw cylinder 112 has an enlarged diameter portion and a reduced diameter portion that are linked by the taper 112B. The female screw 112A is provided on the inner circumference of the enlarged diameter portion of the screw cylinder 112 (i.e., extending from the taper 112B to the proximal end of the screw cylinder).

The stem 111 includes a front stem 111A and a rear stem 111B. The front stem 111A is pushed into the through-hole opening at the distal end of the front frame 11. The rear stem 111B is fixed by a screw 110 to the front stem 111A, and extends rearwardly therefrom within the front frame through-hole toward the screw cylinder 112. Bearings are preferably provided in a space between the front stem 111A and rear stem 111B to assist in slidably and rotatably supporting the spindle within the stem 111, as illustrated.

A digital display portion 113 is provided on the side surface of the front frame 11 and has an output cable 113A extending therefrom for outputting data from the digital display portion 113.

The rear frame 12 is fitted from outside to the proximal end of the front frame 11 and is open toward the front frame 11. The rear frame 12 is fitted over the screw cylinder 112 so as to cover the proximal end of the screw cylinder 112. The rear frame 12 is affixed to the screw cylinder 112 by set screws 121 that mesh with the screw cylinder 112.

A transparent member 122 is provided on the side surface of the rear frame 12. A scale 123 is defined on the transparent member in the axial direction of the spindle 2 as shown in FIG. 1.

The spindle 2 has a length that is greater than the length of the front frame 11. A proximal end of the spindle 2 extends through the screw cylinder 112 and protrudes into the rear frame 12, while the distal end of the spindle 2 protrudes or projects from the distal end of the front frame 11 and the distal end of the front stem 111A. The stem 111 receives and guides the spindle 2 from about a center of the spindle to the distal end thereof, as already described.

An outer surface of the spindle 2 defines a taper 21, the diameter of which increases from a location about midway along the length of the spindle 2, such that a proximal portion of the spindle 2 has a larger diameter than the distal portion of the spindle 2. A male screw 22 is formed on the outer circumference of larger diameter portion of the spindle 2 (i.e., extending from the taper 21 toward the proximal end of the spindle). The male screw 22 meshes with the female screw 112A of the screw cylinder 112 of the front frame 11. The spindle taper 21 cooperates with the screw cylinder taper 112B to define a stop to limit axial movement of the spindle 2, as will be apparent from the following discussion.

A V-shaped groove 23 having a predetermined length is formed in the reduced-diameter portion of the spindle 2, and extends in the axial direction. The V-shaped groove 23 is generally closer to the taper 21 than to the distal end of the spindle 2, and is at least partially received within the rear stem 111B, as illustrated.

The stepping motor 3 has a first end facing the proximal end of the rear frame 12 and a second end facing away from the main body 1. A rotor 31, which serves as a rotary shaft, extends from both ends of the motor 3, and has an axis of rotation common to that of the spindle 2. The motor covers the open proximal end of the rear frame 12. A knob 32 is secured to the rotor 31 adjacent the second end of the motor 3 so as to integrally rotate with the rotor 31. The stepping motor 3 further includes a cable 33 extending outside, as illustrated.

A transmission mechanism 4 is disposed inside the rear frame 12 at the proximal end of the spindle 2. As shown best in FIGS. 3–4, the transmission mechanism 4 includes a short cylindrical first rotary member 41, a second rotary member 42, and connection rods 43. The first rotary member 41 integrally rotates with the spindle 2. The second rotary member 42 is secured to and integrally rotates with the rotor 31 of the stepping motor 3. The connection rods 43 connect the second rotary member 42 to the first rotary member 41 so that the rotary driving forces from the rotor 31 are transferred from the second rotary member 42 to the first rotary member 41 and spindle 2 via the connection rods 43, as will be apparent from the following discussion.

The first rotary member 41 has a short cylindrical shape with a through-hole extending axially through its center. The first rotary member through-hole is tapered so as to receive the proximal end of the spindle 2, whose outer surface also defines a taper 412, in an interference-type fit. A nut 24, which is threadably received on the threaded terminal end of the spindle 2, integrally affixes the spindle 2 to the first rotary member 41 for common rotation.

The first rotary member 41 has two notches 411 formed therein. The notches 411 are disposed at locations radially displaced from, and on opposite sides of, the short cylindrical axis, and are adapted to slidably receive the connection rods 43. A round ring 44 is also fitted to the outer periphery of the first rotary member 41 and serves as a third rotary member, described hereinafter. The round ring 44 has holes or openings formed therein that are aligned with the notches 411 and through which the connection rods 43 extend, as will be apparent from the following discussion.

A scale 441 is provided around the circumference of the round ring 44. A base line 442 for indicating an axial position of the spindle 2 relative to the scale 123 of the rear frame 12 is also provided on the circumference. The transparent member 122 of the rear frame 12, described above, is disposed in conformity with the movement range of the round ring 44.

The transparent member 122 and the scale 123 of the rear frame 12 and the scale 441 and the base line 442 of the round ring 44 together constitute first displacement detection means 5A (FIG. 1).

The second rotary member 42 has a short cylindrical shape, and the rotor 31 extending from the first end of the stepping motor 3 is fitted and fixed to the center of the second rotary member 42. The rotor 31 and second rotary member 42 are co-axial and integrally linked for rotation about their common axis.

Figure 3:
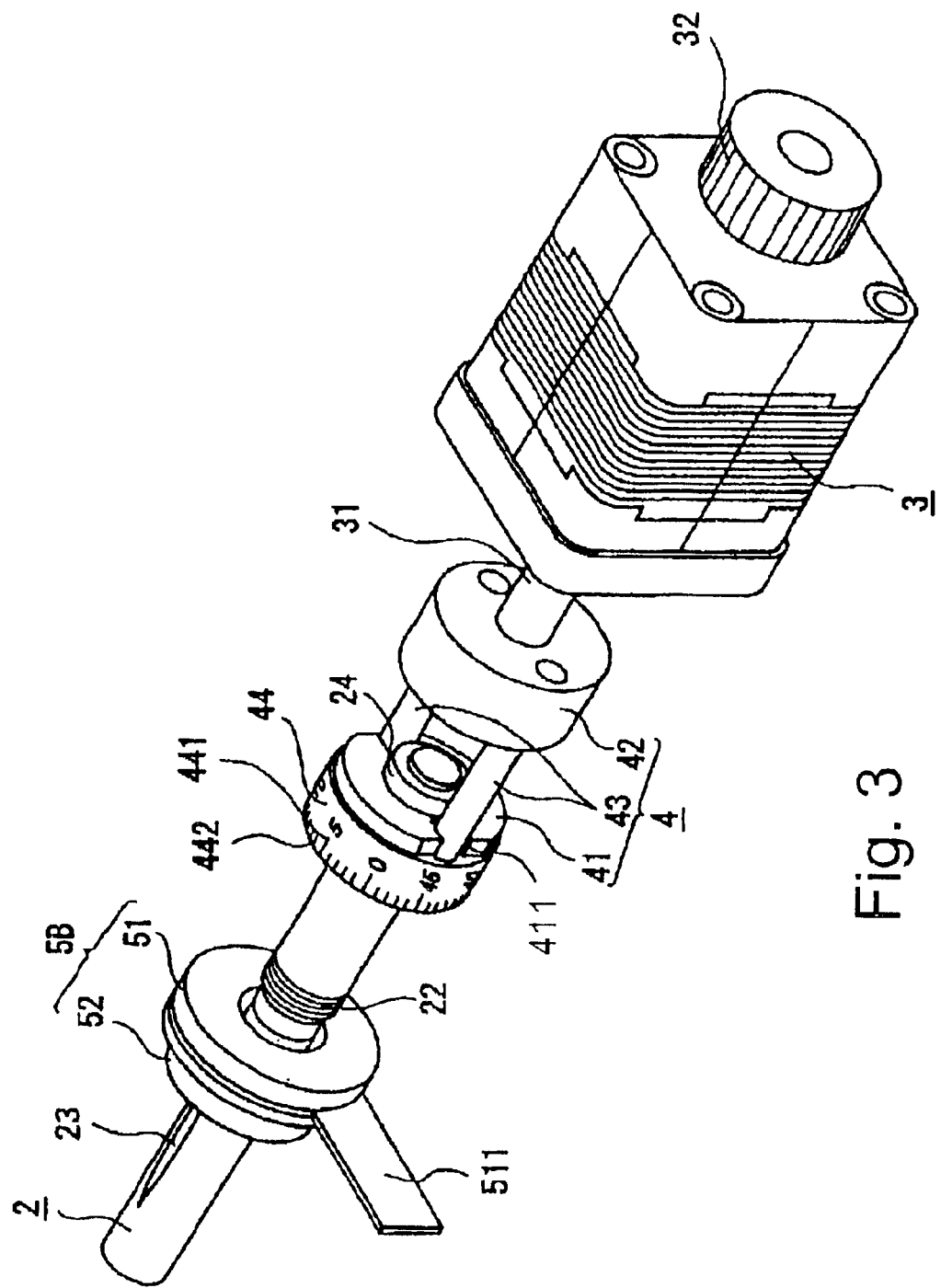
FIG. 3 is a perspective view of primary portions of the first embodiment, with a spindle shown in an extended position.
Figure 4:
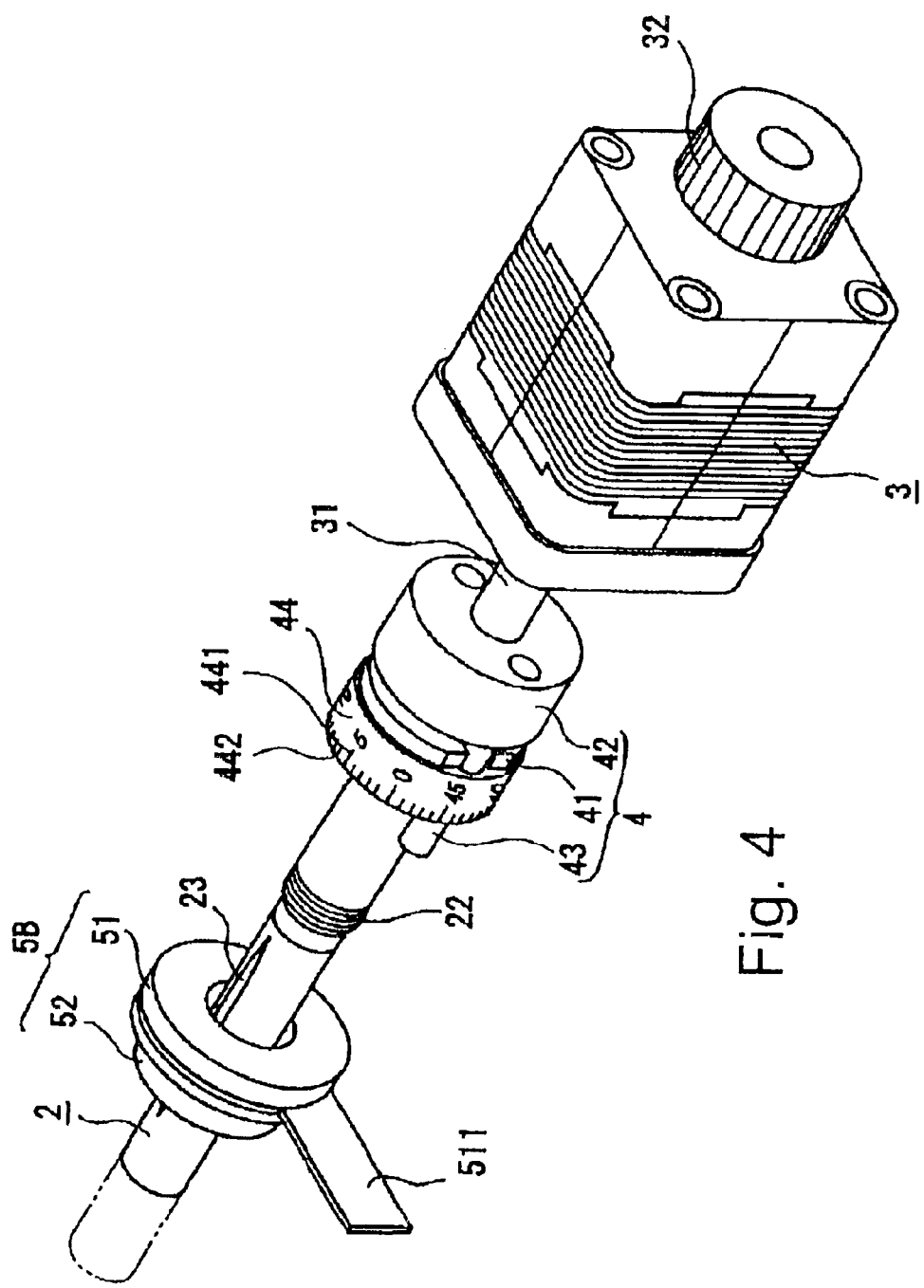
FIG. 4 is a perspective view of the primary portions of the first embodiment similar to FIG. 3, but with the spindle shown in a retracted position.

The two connection rods 43 are disposed between, and rotatably connect, the first and second rotary members 41, 42. The length of the connection rods 43 is greater than the sum of the interval or space between the first and second rotary members 41, 42 and the distance that the spindle 2 is capable of moving in the axial direction. A proximal end of each connection rod 43 is connected to the second rotary member 42 while the distal end of each connection rod 43 is engaged with the corresponding notch 411 of the first rotary member 41. More specifically, the connection rods' proximal ends are affixed within openings provided by the second rotary member 42 and move integrally with the second rotary member 42. The distal portions of the connection rods 43 are engaged with, and extend through, the notches 411 in the first rotary member 41 and the aligned openings in the round ring 44, and are slidably movable relative to the first rotary member 41 so as to project therefrom relatively different amounts as the spindle 2 moves between an extended position (FIG. 3) and a retracted position (FIG. 4). With reference to FIG. 4, the distal portion of the connection rod 43 is shown projecting from a distal side of the round ring 44. The axes of the connection rods 43 are thus parallel to the axis of the spindle 2, while being displaced from the spindle axis. Accordingly, the connection rods 43 are not coaxial with the spindle 2, but the spindle 2 defines a center of rotation of the connection rods 43.

Displacement detection means includes the first displacement detection means 5A, described above, and second displacement detection means 5B for electrically detecting rotation of the spindle 2 and outputting it as a movement displacement amount of the spindle 2. With reference to FIG. 2, the second displacement detection means 5B includes a screw 53 meshing with the V-shaped groove 23 of the spindle 2, a rotor 52 integrally rotating through the screw 53, and a stator 51 for reading the rotation of the rotor 52. The stator 51 is fixed to the screw cylinder 112 through meshing of the set screw 54, and the rotor 52 is rotatably disposed independently of the stator 51.

This embodiment employs a system that uses a change of an electrostatic capacity as a system for reading the rotation amount of the rotor 52 by the stator 51, but this system is not particularly restrictive.

The amount of rotation of the rotor 52 read by the stator 51 is sent to the digital display portion 113 through the cable 511 (FIGS. 3–4), is converted to the movement displacement amount of the spindle 2, and is then displayed.

To use the linear actuator, the stepping motor 3 is first driven so that the spindle 2 is moved to match a measurement object or to match the set position of the object by a predetermined amount.

At this time, the movement displacement amount of the spindle 2 is displayed on the digital display portion 113 and can be read from the position of the base line 442 on the round ring 44 and from the scales 123 and 441 through the transparent member 122 provided to the rear frame 12.

When the stepping motor 3 is driven, the rotation of the rotor 31 rotates the second rotary member 42. Next, the connection rods 43 connected to the second rotary member 42 are rotated, with the axis of the spindle 2 as the center of rotation, and the rotary motion is transmitted from the second rotary member 42 to the first rotary member 41. Subsequently, as the spindle 2 and the first rotary member 41 rotate integrally, the spindle 2 is rotated and moves in the axial direction through engagement between the female screw 112A of the screw cylinder 112 and the male screw 22 of the spindle 2.

When the spindle 2 is thus rotated and moves in the axial direction, the screw 53 meshing with the V-shaped groove 23 of the spindle 2 rotates the rotor 52. Since the V-shaped groove 23 is formed, in this instance, to a predetermined length, the engagement between the screw 53 and the V-shaped groove 23 is maintained even when the spindle 2 moves in the axial direction. The stator 51 reads the rotation of the rotor 52 and the digital display portion 113 displays the movement displacement amount of the spindle 2.

As noted hereinbefore, the connection rods 43 are fixed to the second rotary member 42 but are meshed in such a fashion as to slide in the axial direction relative to the first rotary member 41. Therefore, sliding of the connection rods 43 keeps the connection rods 43 and the first rotary member 41 engaged, as shown in FIGS. 3 and 4, even when the interval or space between the first rotary member 41 and the second rotary member 42 changes, and rotation is transmitted from the second rotary member 42 to the first rotary member 41.

In other words, even when the spindle 2 moves axially while the position of the stepping motor 3 is constant, rotation is transmitted from the stepping motor 3 to the spindle 2. Consequently, it is not necessary to reserve space for the cable 33 of the stepping motor 3, as has been necessary in the traditional linear actuator in which the rotation driving means moves with the spindle 2. Therefore, the size of the linear actuator may be reduced. Also, since the cable 33 does not extend and contract, damage to the cable 33 is prevented.

The transparent member 122 and the scale 123 formed in the axial direction are arranged on the side surface of the rear frame 12. The base line 442 for indicating the axial position of the spindle 2 and the scale 441 for indicating the rotational movement displacement amount of the spindle 2 from the angle of rotation are arranged on the round ring 44 fitted to the outer circumference of the first rotary member 41. Therefore, the movement displacement amount of the spindle 2 can be read.

At this time, the rear frame 12 is a separate body from the front frame 11 but is merely fixed by the set screws 121 to the screw cylinder 112 of the front frame 11. Therefore, by turning the rear frame 12, the transparent member 122 can be moved to a position where the scales 123 and 441 can be read more easily, in accordance with the mode of use of the linear actuator.

The knob 32 is provided on the rotor 31 of the stepping motor 3. When the knob 32 is manually rotated, the rotor 31 of the stepping motor 3 rotates and the spindle 2 is thereby manually moved. In consequence, the spindle 2 can be manually moved without driving the stepping motor 3. As will be appreciated by those skilled in the art, manual movement of the spindle 2 provides an excellent operational factor, especially when the position of the spindle 2 is to be finely adjusted.

In the linear actuator according to the related art, engagement means or a gear train is interposed between the main body and the rotation driving means, and the main body and the rotation driving means are integral. Therefore, in the prior art it is not possible, or is very difficult, to exchange the rotation driving means.

On the other hand, in accordance with the first embodiment of the invention, the stepping motor 3 is a separate body from the main body 1 and is not at all engaged with the main body 1. Since the stepping motor 3 is merely fitted to the second rotary member 42, various rotation driving means can be used to replace the stepping motor 3. Accordingly, the present invention is adaptable and modifiable in accordance with the intended application.

In the linear actuator according to the related art, the displacement detection means does not directly read the movement displacement amount of the spindle, but rather reads the rotation of the rotor, the driving shaft, or the motor. Therefore, in the prior art an error is likely to develop such that the displayed movement is not equal to the movement displacement amount of the spindle. On the other hand, in the first embodiment of the present invention, the V-shaped groove 23 is formed in the spindle 2 and the rotor 52 is rotated through the engagement between the V-shaped groove 23 and the screw 53. Therefore, the amount of spindle rotation is directly read and errors do not develop.

The linear actuator of this embodiment includes the output cable 113A for outputting the data from the digital display portion 113 and the cable 33 extending outside from the stepping motor 3. Therefore, with the present invention it is also possible to output the data of the movement displacement amount of the spindle 2 measured by the displacement detection means to external equipment through the output cable 113A and to execute feedback control of the stepping motor 3 from the external equipment through the cable 33 on the basis of this data.

In the present invention, when the spindle 2 moves axially toward the full-extended position, the engagement between the first rotary member 41 and the connection rod 43 cannot fall off. Engagement of the tapers 112B and 21 formed on the screw cylinder 112 and the spindle 2, respectively, serves as a stop to restrict excessive axial movement of the spindle 2. Therefore, excessive axial movement (extension) of the spindle 2 is prevented, and disengagement of the first rotary member 41 from the connection rod 43 is avoided.

Figure 5:
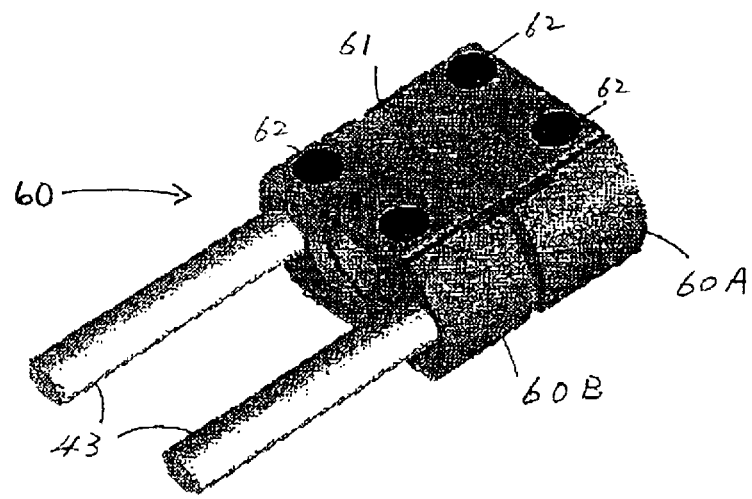
FIG. 5 is a perspective view of an alterative second rotary member according to a second embodiment of the present invention.
Figure 6:
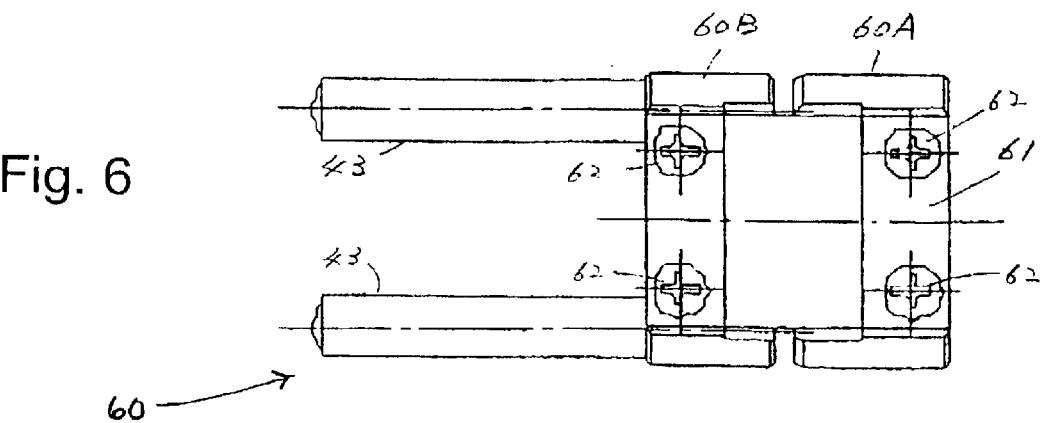
FIG. 6 is a top plan view of the alternative second rotary member shown in FIG. 5.
Figure 7:
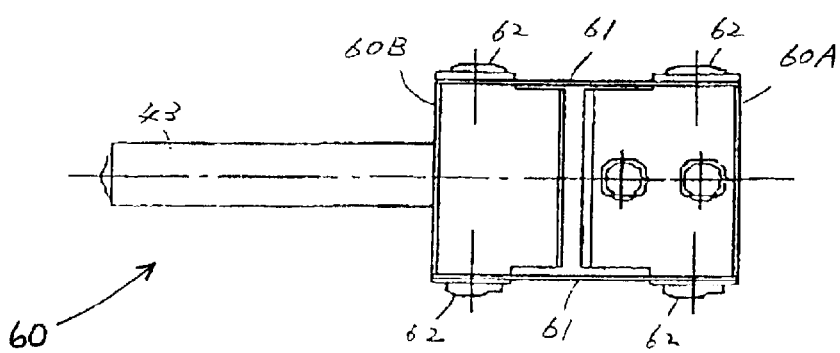
FIG. 7 is a side elevational view of the alterative second rotary member shown in FIGS. 5–6; and, FIG. 8 is a side view showing a linear actuator according to a third embodiment of the invention.

With reference to FIGS. 5–7, an alternative second rotary member 60, which may replace the second rotary member 42 described hereinbefore, is illustrated. The alternative second rotary member includes a first member 60A and a second member 60B that are connected to one another by a pair of rectangular-shaped flat spring plates 61. The first member 60A is disposed at a relatively rearward or proximal location, and receives the rotor 31, described hereinbefore. The second member 60B is disposed at a relatively forward or distal location, and has the connection rods 43 affixed thereto and extending therefrom, as illustrated. Each end of the flat spring plates 61 is secured to the first and second members 60A, 60B, respectively, by screws 62. Should there be slight misalignment between the axis of the rotor 31 and the axis of the spindle 2, the flat spring plates 61 will bend to compensate for this misalignment and thereby ensure that the center of rotation of the connection rods 43 is on the spindle axis.

In a second embodiment incorporating the alternative second rotary member 60, should the axis of the rotor 31 be slightly misaligned with the axis of spindle 2, the flat spring plates 61 will bend and absorb this misalignment. Therefore, the two connection rods 43 will remain aligned with the notches 411 and essentially parallel to the axis of the spindle 2, thereby insuring that the connection rods 43 can freely slide through the notches 411 and the aligned openings of the round ring 44. Accordingly, even when the center axis of the stepping motor 3 is shifted from the axis of the spindle 2, smooth operation of the linear actuator is maintained.

Figure 8:
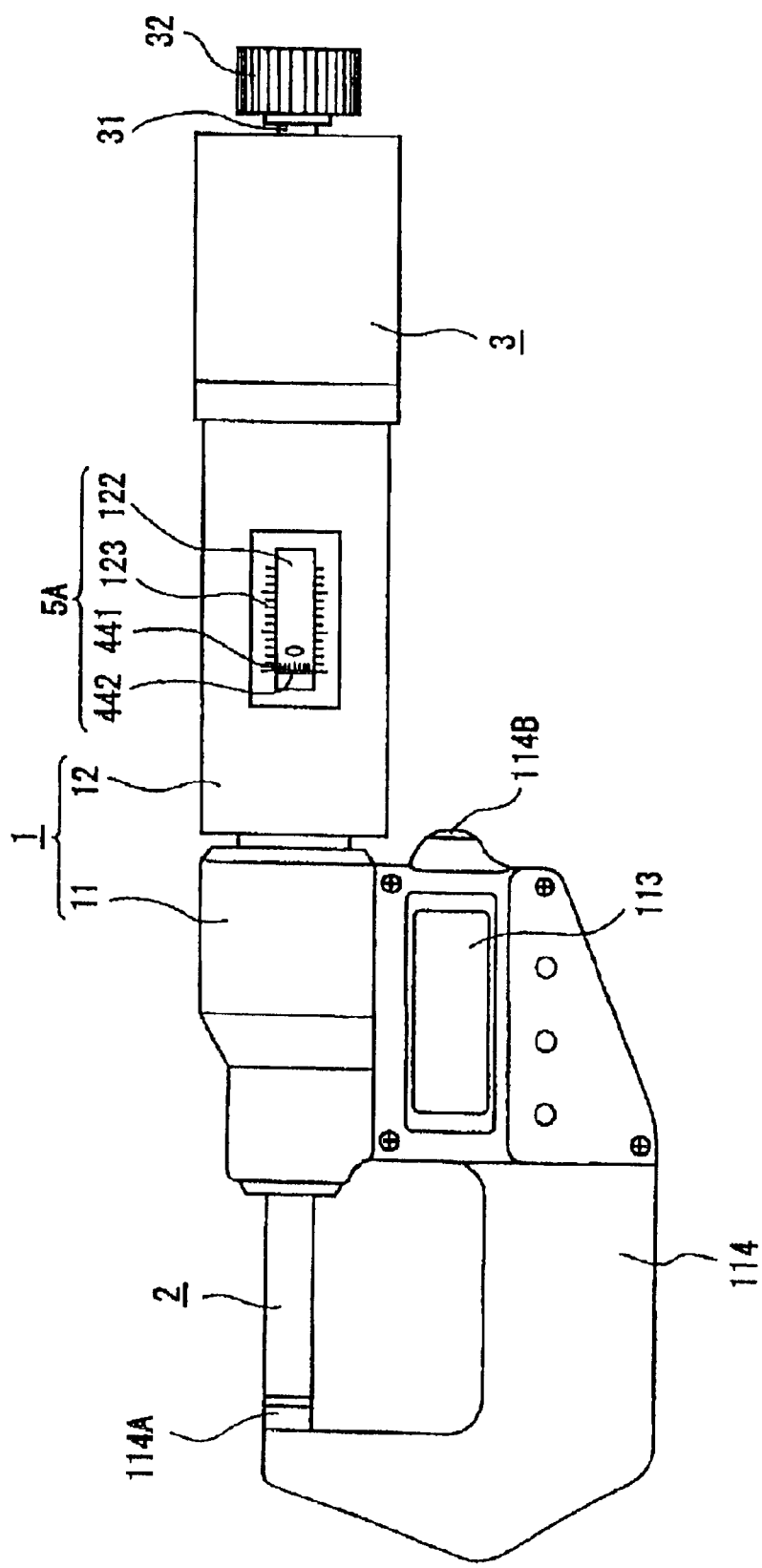

The third embodiment of the invention drives the spindle 2 of the external micrometer by means of the stepping motor 3 as shown in FIG. 8.

The basic construction of the third embodiment is the same as that of either the first embodiment or the second embodiment described previously. However, in the third embodiment an arm 114 is provided on the main body 1 and an anvil 114A is arranged at the distal end of the arm 114 that opposes the spindle 2 on the axis of the spindle 2. A switch 114B for driving the stepping motor 3 is also provided, and a cell for driving the stepping motor 3 is built in.

According to the third embodiment, the linear actuator can measure the size of the measurement portion when the spindle 2 and the anvil 114A are brought into contact with the measurement position of the measurement object. Since this embodiment includes the switch 114B for driving the stepping motor 3 and the built-in cell, an operator can measure the measurement object by one hand without being restricted by cords (113A, 33).

As is obvious from the embodiments described above, the transmission mechanism 4 of the invention has a simple construction in which the distal end of the first rotary member 41 is merely fixed to the proximal end of the spindle 2. Therefore, existing micrometer heads and external micrometers can be easily driven using the motor.

Using the stepping motor 3, the linear actuator of the invention can measure the load applied to the stepping motor 3 by detecting the difference of the rotating phase of the rotor 31 from that of the rotor 52 on the basis of the driving signal for driving the stepping motor 3. Therefore, when the stepping motor 3 is subjected to feedback control, the force for driving the spindle, that is, the measurement force, can be kept within a predetermined range.

The linear actuator according to the invention is not limited to the embodiments described above, but can, of course, be changed or modified in various ways within the scope thereof. For example, the linear actuator is not limited to the micrometer head or the external micrometer, but rather may be those that move the driving member through rotation. Also, in the embodiments described above, the main body 1, instead of having a separate front frame 11 and rear frame 12, may be constituted as an integral unit. Further, various motors may be used as the rotation driving means besides the stepping motor 3.

In the transmission mechanism 4 according to the embodiments, the connection rods 43 are slidably engaged with the first rotary member 41 and are integrally affixed to the second rotary member 42, 60. Naturally, this arrangement may be reversed so that the connection rods 43 are integrally affixed to the first rotary member 41 and slidably received by the second rotary member 42, 60. Further, assuming appropriate structure is provided to prevent the connection rods 43 from falling out while still permitting a full range of spindle motion, the connection rods 43 may be slidably received in both the first and second rotary members 41; 42, 60.

In the embodiments given above, the third rotary member is the round ring 44 that engages the first rotary member 41. However, it is contemplated that a cylindrical rotary body may be provided separate from to the first rotary member 41.

What is claimed is:

1. A linear actuator comprising:
    a driving member defining an axle arid being fixed to a main body so as to be capable of moving in an axial direction;
    displacement detection means for detecting a movement displacement amount of said driving member;
    rotation driving means disposed adjacent a proximal end of said driving member, said rotation driving means defining an axis; and a transmission mechanism for transmitting turning force of said rotation driving means to said driving member; wherein:

said transmission mechanism includes a first rotary member fitted to the proximal end of said driving member end and integrally rotating with said driving member, a second rotary member fitted to a rotary shaft of said rotation driving means and a plurality of connection rods extending between said first and second rotary members and being adapted to transmit rotation of said second rotary member to said first rotary member; and each of said connection rods defines an axis that is parallel to the axis of said driving member while being displaced from said driving member axis, said connection rods are connected to one of said first and second rotary members so as to move integrally with said one of said first and second rotary members, and are engaged with the other of said first and second rotary members so as to be capable of sliding in an axial direction relative to said other of said first and second rotary members.

2. The linear actuator according to claim 1, wherein said other of said first and second rotary members defines a plurality of recesses, each of said recesses receiving one of said connection rods such that said connection rods are adapted to slide axially through the recess.

3. The linear actuator according to claim 1, wherein each of said plurality of recesses defines a slit or notch in said other of said first and second rotary members.

4. The linear actuator according to claim 1, wherein said rotation driving means has a first side facing toward the transmission mechanism and a second, oppositely-directed side, and wherein a knob rotating integrally with said rotary shaft of said rotation driving means is disposed on said second side of said rotation driving means.

5. The linear actuator according to claim 2, wherein said rotation driving means has a first side facing toward the transmission mechanism and a second, oppositely-directed side, and wherein a knob rotating integrally with said rotary shaft of said rotation driving means is disposed on said second side of said rotation driving means.

6. The linear actuator according to claim 1, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed on a circumferential side surface of said third rotary member to permit a user to determine an amount of axial movement of the driving member.

7. The linear actuator according to claim 2, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed on a circumferential side surface of said third rotary member to permit a user to determine an amount of axial movement of the driving member.

8. The linear actuator according to claim 4, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed on a circumferential side surface of said third rotary member to permit a user to determine an amount of axial movement of the driving member.

9. The linear actuator according to claim 5, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed on a circumferential side surface of said third rotary member to permit user to determine an amount of axial movement of the driving member.

10. The linear actuator according to claim 1, wherein said second rotary member comprises:

a first member fitted on the rotary shaft of said rotation driving means;

a second member affixed to said connection rods; and, a spring member extending between and interconnecting said first and second members.

11. The linear actuator according to claim 10, wherein said spring member is affixed to said first and second members and is adapted to absorb misalignment between the driving member axis and the rotation driving means axis so that the connection rods may freely slide essentially parallel to the driving member axis.

12. The linear actuator according to claim 11, wherein said connection rods are affixed to said second rotary member so as to rotate integrally with said second rotary member.

13. The linear actuator according to claim 12, wherein said first rotary member defines recesses or slits that said connection rods slidably extend through so as axially slide relative to said first rotary member as said spindle moves axially.

14. The linear actuator according to claim 11, wherein said rotation driving means has a first side facing toward the transmission mechanism and a second, oppositely-directed side, and wherein a knob rotating integrally with said rotary shaft of said rotation driving means is disposed on said second side of said rotation driving means.

15. The linear actuator according to claim 12, wherein said rotation driving means has a first side facing toward the transmission mechanism and a second, oppositely-directed side, and wherein a knob rotating integrally with said rotary shaft of said rotation driving means is disposed on said second side of said rotation driving means.

16. The linear actuator according to claim 11, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed on a circumferential side surface of said third rotary member to permit a user to determine an amount of axial movement of the driving member.

17. The linear actuator according to claim 12, further comprising a third rotary member moving end rotating integrally with said driving member, and wherein a side surface of said main body provides a transparent member corresponding to a movable zone of said third rotary member, a first scale is provided by said main body side surface In a moving direction of said third rotary member and second scale is formed on a circumferential side surface of said third rotary member to permit a user to determine an amount of axial movement of the driving member.

18. The linear actuator according to claim 14, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed an a circumferential side surface of said third rotary member to permit a user to determine an amount of axial movement of the driving member.

19. The linear actuator according to claim 15, further comprising a third rotary member moving and rotating integrally with said driving member, and wherein a side surface of said main body provides a transparent member corresponding to a movable zone of said third rotary member, a first scale is provided by said main body side surface in a moving direction of said third rotary member and second scale is formed on a circumferential side surface of said third rotary member to permit a user to determine an amount of axial movement of the driving member.

* * * * *

UNITED STATES PATENT AND TRADEMARK OFFICE
CERTIFICATE OF CORRECTION

PATENT NO. : 6,781,265 B2
DATED : August 24, 2004
INVENTOR(S) : Hayashida et al.

It is certified that error appears in the above-identified patent and that said Letters Patent is hereby corrected as shown below:

Column 11,
Line 6, after "member" delete "end".

Signed and Sealed this

Fourteenth Day of December, 2004

JON W. DUDAS
*Director of the United States Patent and Trademark Office*